(12) United States Patent
Yeh et al.

(10) Patent No.: US 12,498,528 B2
(45) Date of Patent: Dec. 16, 2025

(54) OPTICAL MODULE INCLUDING PIVOTABLE COMPONENT FOR EASY RELEASING AND OPTICAL COMMUNICATION ASSEMBLY HAVING THE SAME

(71) Applicant: Prime World International Holdings Ltd., New Taipei (TW)

(72) Inventors: Che-Shou Yeh, New Taipei (TW); Ming-You Lai, New Taipei (TW); Hsuan-Chen Shiu, New Taipei (TW); Yu Chen, New Taipei (TW); Yi-Ju Wang, New Taipei (TW)

(73) Assignee: Prime World International Holdings Ltd., New Taipei (TW)

( * ) Notice: Subject to any disclaimer, the term of this patent is extended or adjusted under 35 U.S.C. 154(b) by 287 days.

(21) Appl. No.: 18/198,535

(22) Filed: May 17, 2023

(65) Prior Publication Data

US 2024/0385391 A1   Nov. 21, 2024

(51) Int. Cl.
  *G02B 6/42* (2006.01)
  *H01R 13/627* (2006.01)
  *H01R 13/633* (2006.01)

(52) U.S. Cl.
  CPC .......... *G02B 6/4261* (2013.01); *G02B 6/426* (2013.01); *H01R 13/6275* (2013.01); *H01R 13/633* (2013.01); *H01R 13/6335* (2013.01); *G02B 6/4246* (2013.01)

(58) Field of Classification Search
  CPC .... G02B 6/4246; G02B 6/4256; G02B 6/426; G02B 6/4261; H01R 13/6275; H01R 13/633; H01R 13/6335
  See application file for complete search history.

(56) References Cited

U.S. PATENT DOCUMENTS

| | | | | |
|---|---|---|---|---|
| 6,929,403 | B1 * | 8/2005 | Arciniegas | H01R 13/6278 439/352 |
| 7,374,347 | B1 * | 5/2008 | Oki | G02B 6/4261 385/88 |
| 2003/0044129 | A1 * | 3/2003 | Ahrens | G02B 6/389 385/92 |
| 2003/0049000 | A1 * | 3/2003 | Wu | G02B 6/4292 385/92 |

(Continued)

*Primary Examiner* — Michael Stahl
(74) *Attorney, Agent, or Firm* — Grossman Tucker Perreault & Pfleger, PLLC (57) ABSTRACT

An optical module includes a housing and a release mechanism. The housing includes an outer lateral surface. The release mechanism includes an arm and a releasing component. The arm is disposed on the outer lateral surface and movable relative to the housing. The releasing component is disposed on the outer lateral surface and includes a pivot, a releasing portion and a pressed portion. The pivot is between the releasing portion and the pressed portion. The pivot is disposed on the housing. The arm pushes the pressed portion to pivot the releasing component. At an idle state of the release mechanism, a movement of the housing is restricted by an interference between a flexible counterpart of a cage and the housing. At a releasing state of the release mechanism, the releasing portion deforms the flexible counterpart, thereby removing the interference between the flexible counterpart and the housing.

19 Claims, 6 Drawing Sheets

(56) References Cited

U.S. PATENT DOCUMENTS

| | | | |
|---|---|---|---|
| 2004/0228582 A1* | 11/2004 | Yamada | G02B 6/4261 |
| | | | 385/92 |
| 2005/0141827 A1* | 6/2005 | Yamada | G02B 6/4261 |
| | | | 385/92 |
| 2006/0014408 A1* | 1/2006 | Guan | G02B 6/3897 |
| | | | 439/160 |
| 2010/0142898 A1* | 6/2010 | Teo | H01R 13/6275 |
| | | | 439/157 |
| 2015/0093083 A1* | 4/2015 | Tsai | G02B 6/4261 |
| | | | 385/92 |
| 2016/0216460 A1* | 7/2016 | Yang | G02B 6/3893 |
| 2018/0254581 A1* | 9/2018 | Yeh | H01R 13/6272 |
| 2018/0329161 A1* | 11/2018 | Takeuchi | G02B 6/4246 |
| 2021/0405312 A1* | 12/2021 | Chen | G02B 6/4261 |
| 2024/0094487 A1* | 3/2024 | Zhang | G02B 6/4261 |
| 2024/0388037 A1* | 11/2024 | Shiu | H01R 13/62938 |

* cited by examiner

OPTICAL MODULE INCLUDING PIVOTABLE COMPONENT FOR EASY RELEASING AND OPTICAL COMMUNICATION ASSEMBLY HAVING THE SAME

BACKGROUND

1. Technical Field

The present disclosure relates to optical communication, more particularly to an optical communication assembly including a cage and an optical module.

2. Related Art

Optical modules, such as optical transceivers, are generally installed in electronic communication facilities in modern high-speed communication networks. In order to make flexible the design of an electronic communication facility and less burdensome the maintenance of the same, an optical module is inserted into a corresponding cage that is disposed in the communication facility in a pluggable manner. In order to define the electrical-to-mechanical interface of the optical module and the corresponding cage, different form factors such as XFP (10 Gigabit Small Form Factor Pluggable) used in 10 GB/s communication rate, QSFP (Quad Small Form-factor Pluggable), or others such as QSFP-DD (double density) and QSFP-28 at different communication rates have been made available.

A cage is usually provided to secure the optical module. On the other hand, the optical module must include a release mechanism so that the optical module could be released from the cage smoothly when necessary.

SUMMARY

According to one aspect of the present disclosure, an optical module, configured to be inserted into a cage in pluggable manner, includes a housing and a release mechanism. The housing includes an outer lateral surface. The release mechanism includes an arm and a releasing component. The arm is disposed on the outer lateral surface, and the arm is movable relative to the housing along a releasing direction. The releasing component is disposed on the outer lateral surface. The releasing component includes a pivot, a releasing portion and a pressed portion connected with one another. The pivot is between the releasing portion and the pressed portion. The pivot is disposed on the housing. An axis of the pivot is non-parallel to the releasing direction. The arm moves along the releasing direction to push the pressed portion so as to pivot the releasing component. The release mechanism is at either an idle state or a releasing state based on pivoting of the releasing component. At the idle state, a movement of the housing is restricted by an interference between a flexible counterpart of the cage and the housing. At the releasing state, the releasing portion pushes the flexible counterpart deforming the same, thereby removing the interference between the flexible counterpart and the housing.

According to another aspect of the present disclosure, an external laser small form factor pluggable (ELSFP) module, which is utilized in external light source setting, includes a housing and a release mechanism. The housing includes an outer lateral surface. The release mechanism includes an arm and a releasing component. The arm is disposed on the outer lateral surface, and the arm is movable relative to the housing along a releasing direction. The releasing component is disposed on the outer lateral surface. The releasing component includes a pivot, a releasing portion and a pressed portion connected with one another. The pivot is between the releasing portion and the pressed portion. The pivot is disposed on the housing. An axis of the pivot is non-parallel to the releasing direction. The arm moves along the releasing direction to push the pressed portion so as to pivot the releasing component. A length of the releasing portion extending from the pivot is larger than a length of the pressed portion extending from the pivot, and an extension direction of the releasing portion is non-parallel to an extension direction of the pressed portion.

According to still another aspect of the present disclosure, an optical communication assembly includes a cage and an optical module inserted into the cage in pluggable manner. The optical module includes a housing and a release mechanism. The housing includes an outer lateral surface. The release mechanism includes an arm and a releasing component. The arm is disposed on the outer lateral surface, and the arm is movable relative to the housing along a releasing direction. The releasing component is disposed on the outer lateral surface. The releasing component includes a pivot, a releasing portion and a pressed portion connected with one another. The pivot is between the releasing portion and the pressed portion. The pivot is disposed on the housing. The arm moves along the releasing direction to push the pressed portion so as to pivot the releasing component. The release mechanism is at either an idle state or a releasing state based on pivoting of the releasing component. At the idle state, a movement of the housing is restricted by an interference between a flexible counterpart of the cage and the housing. At the releasing state, the releasing portion pushes the flexible counterpart deforming the same, thereby removing the interference between the flexible counterpart and the housing.

BRIEF DESCRIPTION OF THE DRAWINGS

The present disclosure will become more fully understood from the detailed description given below and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present disclosure. The following embodiments further illustrate various aspects of the present disclosure, but are not meant to limit the scope of the present disclosure.

As to a conventional release mechanism for releasing an optical module from a cage, the optical module is secured by the release mechanism that snaps a flexible sheet of the cage, and the release mechanism has an inclined surface that allows the optical module to be released by sliding the flexible sheet along this inclined surface. However, with the development of miniaturization and specification specialization of optical modules, the conventional release mechanism gradually becomes difficult to meet the demands. For example, for an ELSFP module, in order to ensure excellent optical coupling efficiency, the MPO connector inside the ELSFP module is tightly fitted into an external MPO connector, causing the release of the ELSFP module to be withdrawn out of the cage to require a relatively larger amount of force (about 55~60 N).

Figure 1:
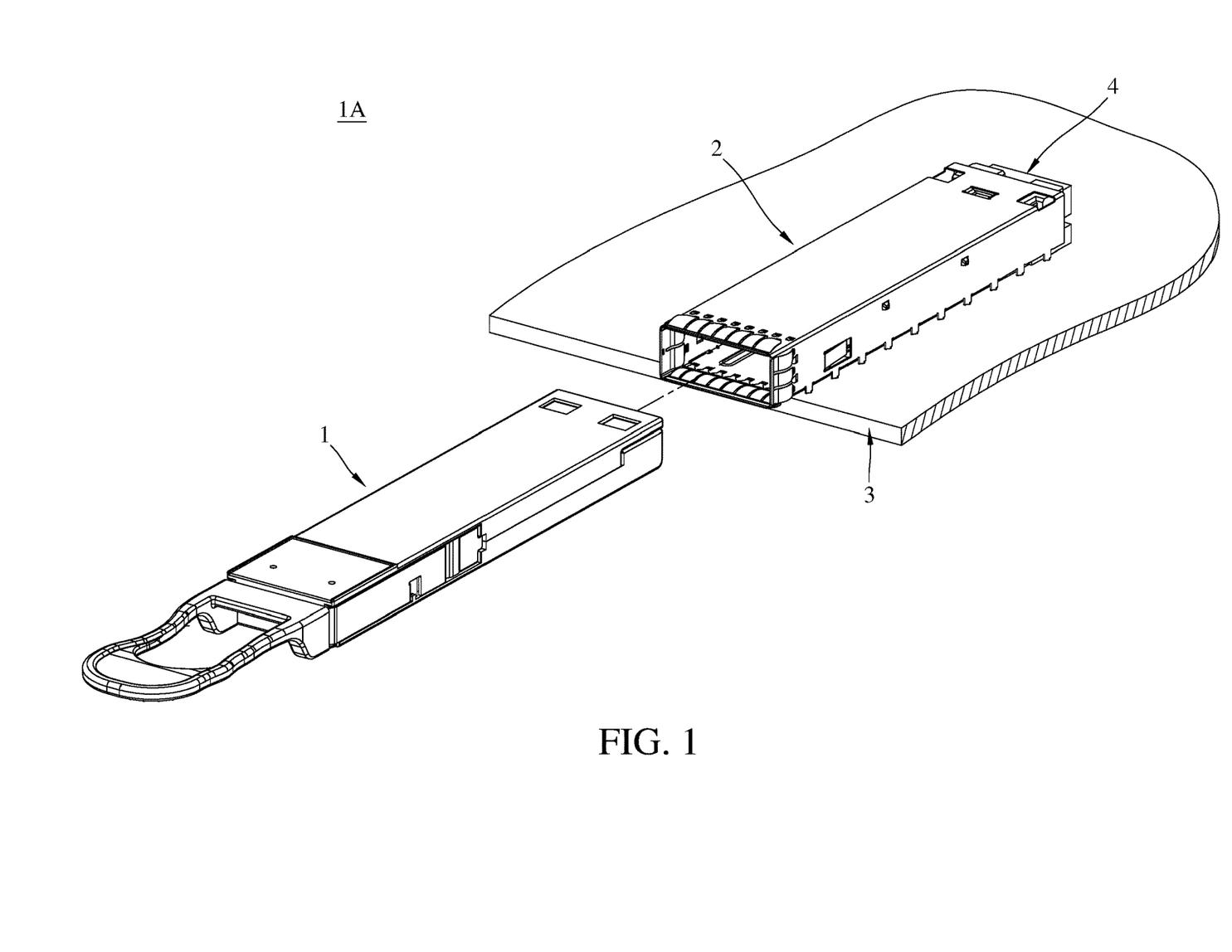
FIG. 1 is a perspective view of an optical communication assembly according to one embodiment of the present disclosure.
Figure 2:
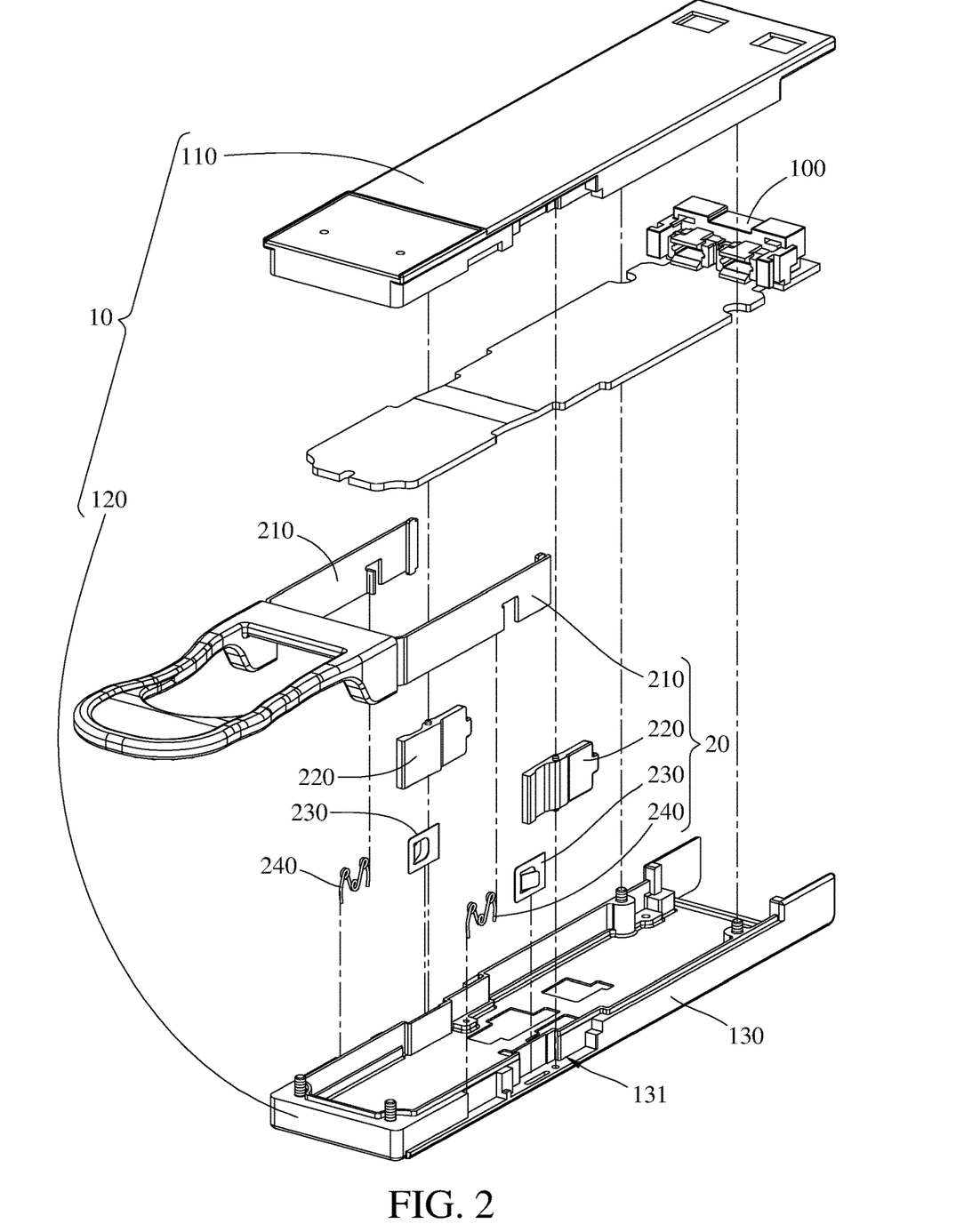
FIG. 2 is an exploded view of an optical module of the optical communication assembly in FIG. 1.
Figure 3:
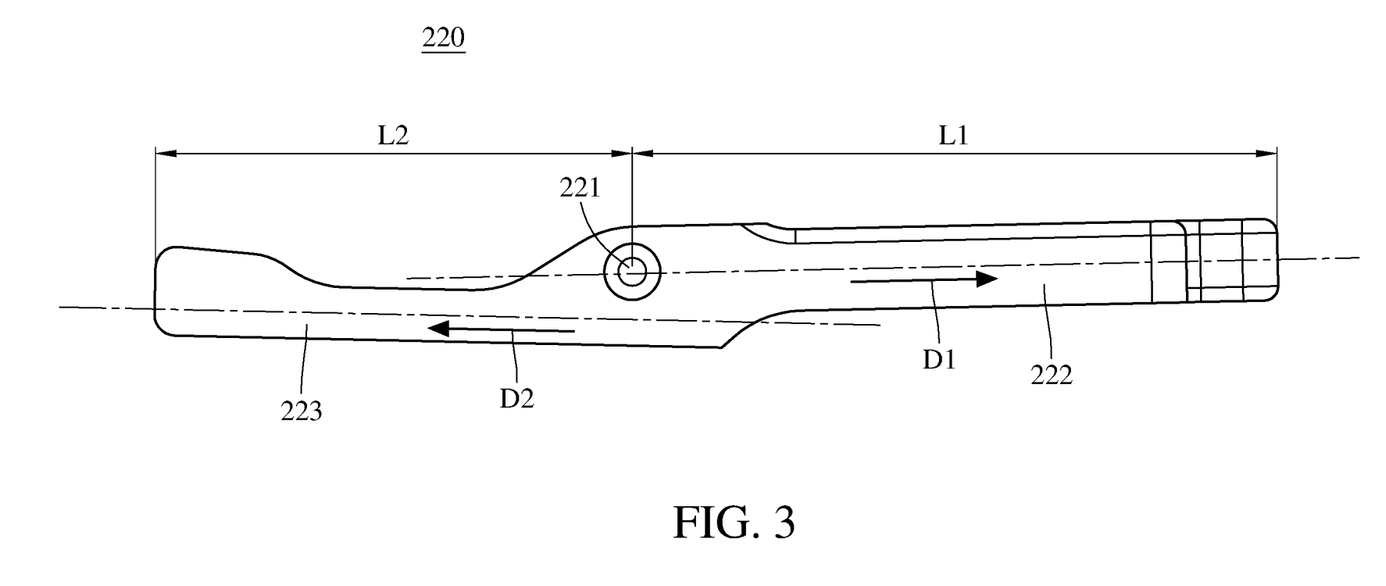
FIG. 3 is a schematic view of a releasing component of the optical module in FIG. 2.

The present disclosure provides a release mechanism of an optical module to facilitate the release of the optical module from a cage. Please refer to FIG. 1 through FIG. 3. FIG. 1 is a perspective view of an optical communication assembly according to one embodiment of the present disclosure, FIG. 2 is an exploded view of an optical module of the optical communication assembly in FIG. 1, and FIG. 3 is a schematic view of a releasing component of the optical module in FIG. 2. In this embodiment, an optical communication assembly 1A may include an optical module 1, a cage 2, a carrier 3 and an external MPO connector 4. The carrier 3 may be a print circuit board of an optical switch box. The cage 2 and the external MPO connector 4 may be mounted on the carrier 3, and the optical module 1 may be inserted into the cage 2.

The optical module 1 may include a housing 10 and a release mechanism 20. The housing 10 may include an upper casing 110 and a lower casing 120 which are assembled together. The housing 10 may be configured to be accommodated in the cage 2, and details will be described hereafter. It is worth noting that the housing 10 including two assembled parts (upper casing 110 and lower casing 120) are not limited in view of embodiments in the present disclosure. In some other embodiments, the housing of the optical module may be a single unit. Referring to the housing 10 as a whole, the housing 10 may include an outer lateral surface 130, and a recess 131 may be formed on the outer lateral surface 130.

In this embodiment, the optical module 1 may be an ELSFP module with one or more transmitter optical sub-assemblies (TOSAs) and a printed circuit board assembly (PCBA) inside the housing 10. In one implementation, there is no optical receiving component, such as receiver optical sub-assembly (ROSA), inside the housing 10. Moreover, a MPO connector 100 may be provided inside the housing 10 for facilitating communication between the TOSA and the external MPO connector 4. It is worth noting that the aforementioned ELSFP module is an exemplary type of the optical module 1 and are not limited in view of embodiments in the present disclosure.

The release mechanism 20 may include an arm 210 and a releasing component 220. The arm 210 may be movably disposed on the outer lateral surface 130 of the housing 10. The releasing component 220 may be disposed in the recess 131 of the outer lateral surface 130. The releasing component 220 might include a pivot 221, a releasing portion 222 and a pressed portion 223 connected with one another (FIG. 3). The pivot 221 may be disposed on the housing 10 and located between the releasing portion 222 and the pressed portion 223. The arm 210 may be moved to push the pressed portion 223 so as to pivot the releasing component 220, and the release mechanism 20 may be at either an idle state (FIG. 4) or a releasing state (FIG. 6) based on pivoting of the releasing component 220. A length L1 of the releasing portion 222 extending from the pivot 221 may be larger than a length L2 of the pressed portion 223 extending from the pivot 221. Furthermore, an extension direction D1 of the releasing portion 222 may be non-parallel to an extension direction D2 of the pressed portion 223.

In this embodiment, the optical module 1 may include a total of two release mechanisms 20 at opposite sides of the housing 10, respectively. It is worth noting that the number of the release mechanisms 20 is not limited in view of embodiments in the present disclosure.

Figure 4:
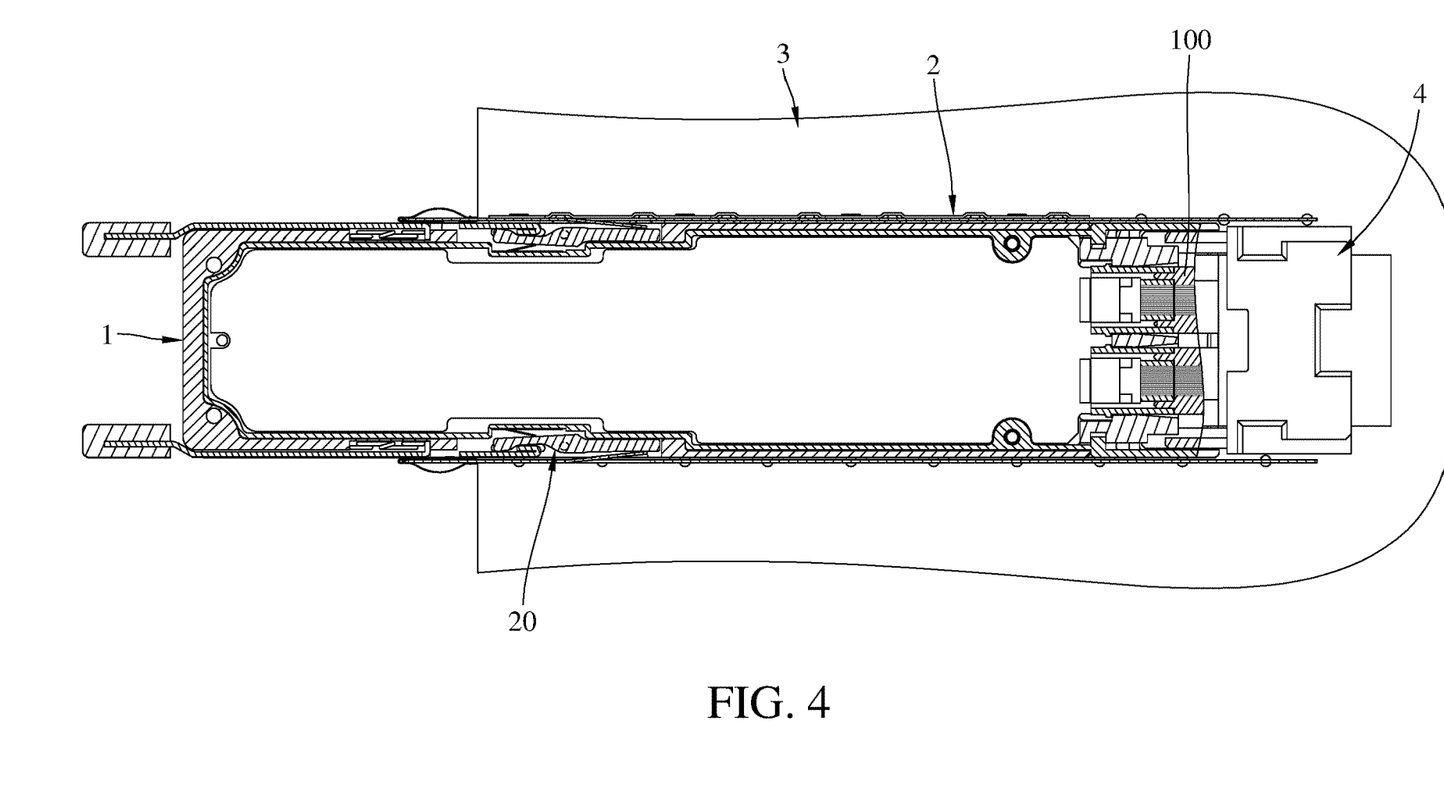
FIG. 4 is a schematic view of the optical communication assembly in FIG. 1, with a release mechanism of the optical module at an idle state.
Figure 5:
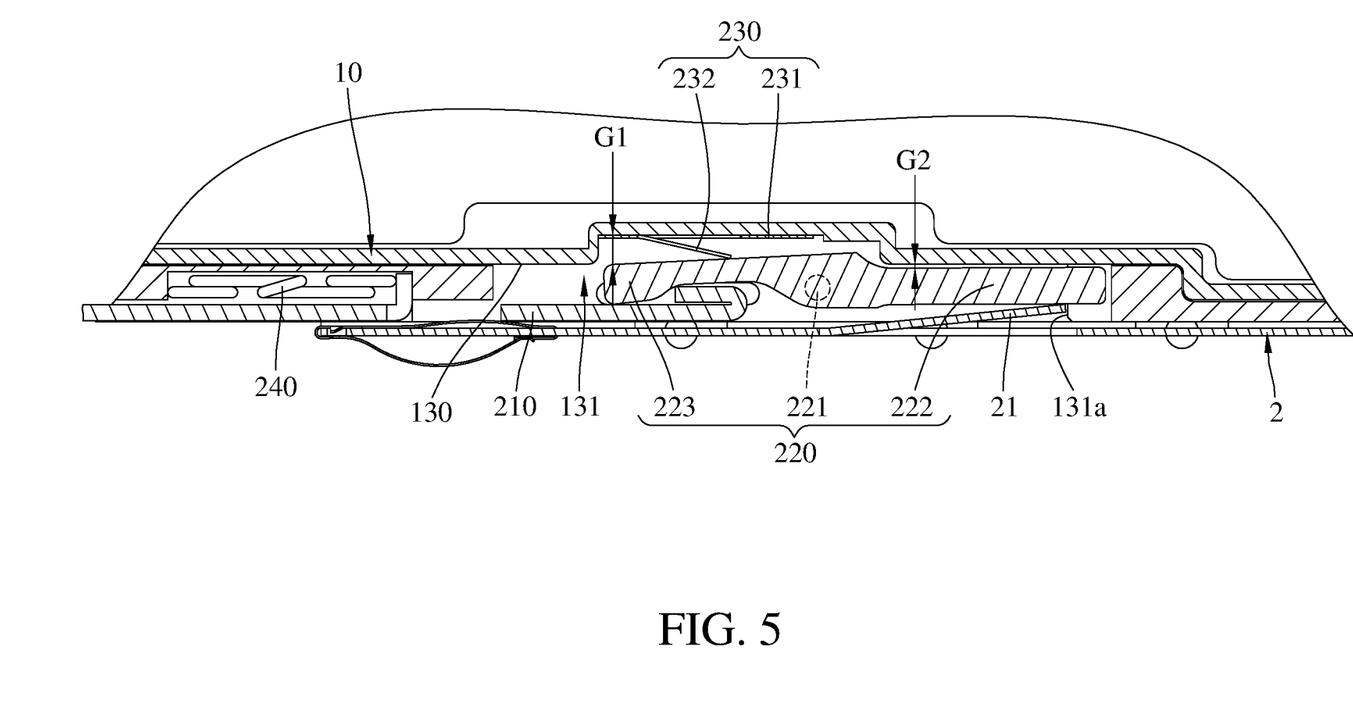
FIG. 5 is a partially enlarged view of the optical communication assembly in FIG. 4.

FIG. 4 is a schematic view of the optical communication assembly in FIG. 1, with a release mechanism of the optical module at an idle state, and FIG. 5 is a partially enlarged view of the optical communication assembly in FIG. 4. For the purpose of illustration, part of the upper casing 110 of the housing 10 and part of the cage 2 are omitted in the drawings.

The arm 210 may physically contact the pressed portion 223 of the releasing component 220 but not apply any force to pivot the releasing component 220. As such, the release mechanism 20 may be normally at the idle state. In such a case, the movement of the housing 10 may be restricted because of interference between the housing 10 and a flexible counterpart 21 of the cage 2. When the optical module 1 is inserted into the cage 2 along an inserting direction, the flexible counterpart 21 may be elastically deformed, or more specifically, bent by the housing 10 in a direction away from the housing 10. Once the optical module 1 reaches a predetermined position in the cage 2, the flexible counterpart 21 may extend into the recess 131 on the outer lateral surface 130, preventing the optical module 1 from accidentally moving out of the cage 2 by the spatial interference between the flexible counterpart 21 and the side wall 131a of the recess 131. Moreover, when the release mechanism is at the idle state, the MPO connector 100 inside the housing 10 may be mechanically fastened with the external MPO connector 4 to realize optical coupling.

Figure 6:
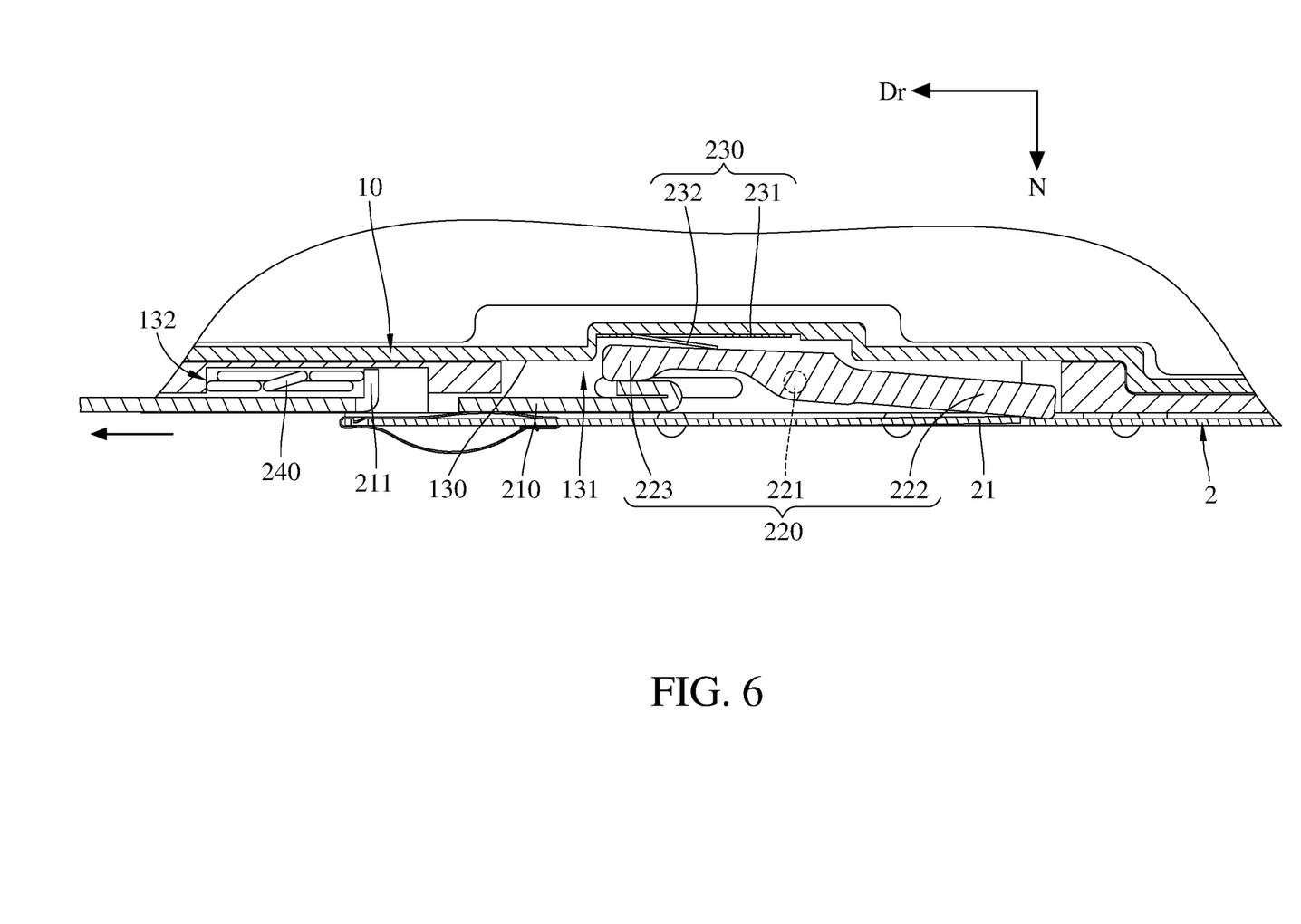
FIG. 6 is a partially enlarged view of the optical communication assembly in FIG. 1, with the release mechanism of the optical module at a releasing state.

The following describes the removal of the optical module 1 from the cage 2. FIG. 6 is a partially enlarged view of the optical communication assembly in FIG. 1, with the release mechanism of the optical module at a releasing state. For the purpose of illustration, part of the upper casing 110 of the housing 10 and part of the cage 2 are omitted in the drawing.

The arm 210 may be movable relative to the housing 10 along a releasing direction Dr opposite the inserting direction so as to push a concave shape of the pressed portion 223, thereby pivoting the releasing component 220. The axis of the pivot 221 may be orthogonal to the releasing direction Dr. The releasing direction Dr and the axis of the pivot 221 may be both orthogonal to a normal direction N of the outer lateral surface 130. The releasing portion 222 of the releasing component 220 at the releasing state may push the flexible counterpart 21 of the cage 2 so as to deform the flexible counterpart 21, offsetting the interference between the flexible counterpart 21 and the housing 10. Specifically, the releasing portion 222 may push the flexible counterpart 21 out of the recess 131 on the outer lateral surface 130, so that the movement of the housing 10 may be no longer restricted by the flexible counterpart 21. In such a case, the optical module 1 could be withdrawn out of the cage 2 along the releasing direction Dr.

In this embodiment, the shape of the releasing component 220 is helpful to facilitate the release of the optical module 1. In one implementation, the length L1 of the releasing portion 222 extending from the pivot 221 may be larger than the length L2 of the pressed portion 223 extending from the pivot 221, as shown in FIG. 3. Such arrangement might provide a balance between the reduction of force for releasing and the reliability of the release mechanism 20, while the longer pressed portion 223 (compared to the releasing portion 222) could result in more unexpected releasing.

Also, the extension direction D1 of the releasing portion 222 may be non-parallel to the extension direction D2 of the pressed portion 223. As shown in FIG. 5, when the release mechanism is at the idle state, a maximum gap G1 between the pressed portion 223 and the outer lateral surface 130 may be larger than a maximum gap G2 between the releasing portion 222 and the outer lateral surface 130. Such arrangement might allow for the releasing portion 222 to have a larger angle of rotation when the arm 210 pivots the releasing component 220 deforming the flexible counterpart 21 of the cage.

Referring to FIG. 2, FIG. 5 and FIG. 6, the release mechanism 20 may further include a restoring component 230 disposed on the housing 10. The restoring component 230 may include a base 231 and a resilient portion 232 connected with each other. The base 231 may be disposed on the outer lateral surface 130 of the housing 10, and the resilient portion 232 may extend toward the pressed portion 223 of the releasing component 220. The pressed portion 223 may be between the arm 210 and the restoring component 230. As shown in FIG. 6, when the release mechanism is at the releasing state, the resilient portion 232 of the restoring component 230 may be elastically deformed by the pressed portion 223 so as to store elastic energy. When the force applied on the pressed portion 223 by the arm 210 is removed, the store elastic energy of the resilient portion 232 recovers the releasing component 220 to its original configuration in FIG. 5. Moreover, the release mechanism 20 may further include an elastic component 240 disposed on the outer lateral surface 130. More specifically, the elastic component 240 may be a torsion spring accommodated in a recess 132 formed on the outer lateral surface 130. As shown in FIG. 6, when the release mechanism is at the releasing state, the elastic component 240 may be deformed by a bent portion 211 of the arm 210 so as to store elastic energy. Similarly, when the force pulling the arm 210 is removed, the store elastic energy of the elastic component 240 recovers the arm 210 to its original configuration in FIG. 5. Accordingly, the release mechanism 20 can be kept at the idle state by the restoring component 230 and the elastic component 240.

According to the present disclosure, the optical module includes a releasing component disposed on the housing. The arm can pivot the releasing component, so that the releasing component can deform the flexible counterpart of the cage to thereby allow the optical module to be withdrawn out of the cage along the releasing direction. The release mechanism with pivotable releasing component is helpful to reduce force needed for the operation of releasing.

In addition, in the ELSFP module, due to the interference fit between the MPO connector inside the housing and the external MPO connector of the optical switch box, the external MPO connector may exert reaction force on the ELSFP module, so that the housing may strongly abut against the flexible counterpart of the cage, and the friction generated due to said abutting of the housing against the flexible counterpart may render difficult bending of the flexible counterpart. The release mechanism of the present disclosure however provides pivotable releasing component to facilitate the bending of the flexible counterpart. In one implementation of the present disclosure, the force needed to withdraw the ELSFP module out of the cage may be reduced to about 25~30 N.

The embodiments are chosen and described in order to best explain the principles of the present disclosure and its practical applications, to thereby enable others skilled in the art to best utilize the present disclosure and various embodiments with various modifications as are suited to the particular use being contemplated. It is intended that the scope of the present disclosure is defined by the following claims and their equivalents.

What is claimed is:

1. An optical module, configured to be inserted into a cage in pluggable manner, comprising:
   a housing comprising two outer lateral surfaces opposite to each other; and
   two release mechanisms respectively at the two outer lateral surfaces, each of the two release mechanisms comprising:
   an arm disposed on the outer lateral surface, wherein the arm is movable relative to the housing along a releasing direction; and
   a releasing component disposed on the outer lateral surface, wherein the releasing component comprises a pivot, a releasing portion and a pressed portion connected with one another, the pivot is between the releasing portion and the pressed portion, the pivot is disposed on the housing, an axis of the pivot is non-parallel to the releasing direction, the arm moves along the releasing direction to push the pressed portion so as to pivot the releasing component, and the release mechanism is at either an idle state or a releasing state based on pivoting of the releasing component;
   wherein, at the idle state, a movement of the housing is restricted by an interference between the cage and the housing;
   wherein, at the releasing state, the releasing portion deforms the cage, thereby removing the interference between the cage and the housing.

2. The optical module according to claim 1, wherein each of the releasing direction and the axis of the pivot is orthogonal to a normal direction of the outer lateral surface.

3. The optical module according to claim 1, wherein, at the idle state, the arm physically contacts the pressed portion.

4. The optical module according to claim 1, wherein a length of the releasing portion from the pivot is larger than a length of the pressed portion from the pivot.

5. The optical module according to claim 1, wherein, at the idle state, a maximum gap between the pressed portion and the outer lateral surface is larger than a maximum gap between the releasing portion and the outer lateral surface.

6. The optical module according to claim 1, wherein each of the release mechanisms further comprises:
   a restoring component disposed on the housing, wherein the pressed portion of the releasing component is between the arm and the restoring component, and
   at the releasing state, the restoring component is deformed by the pressed portion so as to store elastic energy.

7. The optical module according to claim 6, wherein the restoring component comprises a base and a resilient portion connected with each other, the base is disposed on the outer lateral surface of the housing, and the resilient portion extends toward the pressed portion.

8. The optical module according to claim 1, wherein each of the release mechanisms further comprises an elastic component disposed on the outer lateral surface of the housing, wherein, at the releasing state, the elastic component is deformed by the arm so as to store elastic energy.

9. The optical module according to claim 1, wherein there is no optical receiving component inside the housing.

10. The optical module according to claim 1, wherein the optical module is an external laser small form factor pluggable (ELSFP) module comprising a MPO connector inside the housing, and the MPO connector is configured to optical couple with an external MPO connector.

11. An ELSFP module for external light source setting, comprising:
a housing comprising two outer lateral surfaces opposite to each other; and
two release mechanisms respectively at the two outer lateral surfaces, each of the two release mechanisms comprising:
an arm disposed on the outer lateral surface, wherein the arm is movable relative to the housing along a releasing direction; and
a releasing component disposed on the outer lateral surface, wherein the releasing component comprises a pivot, a releasing portion and a pressed portion connected with one another, the pivot is between the releasing portion and the pressed portion, the pivot is disposed on the housing, an axis of the pivot is non-parallel to the releasing direction, and the arm moves along the releasing direction to push the pressed portion so as to pivot the releasing component;
wherein a length of the releasing portion from the pivot is larger than a length of the pressed portion from the pivot, and an extension direction of the releasing portion is non-parallel to an extension direction of the pressed portion.

12. The ELSFP module according to claim 11, wherein each of the releasing direction and the axis of the pivot is orthogonal to a normal direction of the outer lateral surface.

13. The ELSFP module according to claim 11, wherein each of the release mechanisms further comprises:
a restoring component disposed on the housing, wherein the pressed portion of the releasing component is between the arm and the restoring component.

14. The ELSFP module according to claim 13, wherein the restoring component comprises a base and a resilient portion connected with each other, the base is disposed on the outer lateral surface of the housing, and the resilient portion extends toward the pressed portion.

15. An optical communication assembly, comprising:
a cage; and
an optical module inserted into the cage in pluggable manner, and the optical module comprising:
a housing comprising two outer lateral surfaces opposite to each other; and
two release mechanisms respectively at the two outer lateral surfaces, each of the two release mechanisms comprising an arm and a releasing component, wherein the arm is disposed on the outer lateral surface and movable relative to the housing along a releasing direction, the releasing component is disposed on the outer lateral surface and comprises a pivot, a releasing portion and a pressed portion connected with one another, the pivot is between the releasing portion and the pressed portion, the pivot is disposed on the housing, the arm moves along the releasing direction to push the pressed portion so as to pivot the releasing component, and the release mechanism is at either an idle state or a releasing state based on pivoting of the releasing component;
wherein, at the idle state, a movement of the housing is restricted by an interference between the cage and the housing;
wherein, at the releasing state, the releasing portion deforms the cage, thereby removing the interference between the cage and the housing.

16. The optical communication assembly according to claim 15, further comprising an external MPO connector, wherein the optical module is an ELSFP module comprising a MPO connector inside the housing and fastened with the external MPO connector.

17. The optical communication assembly according to claim 15, wherein each of the release mechanisms further comprises:
a restoring component disposed on the housing, wherein the pressed portion of the releasing component is between the arm and the restoring component, and
at the releasing state, the restoring component is deformed by the pressed portion so as to store elastic energy.

18. The optical communication assembly according to claim 17, wherein the restoring component comprises a base and a resilient portion connected with each other, the base is disposed on the outer lateral surface of the housing, and the resilient portion extends toward the pressed portion.

19. The optical communication assembly according to claim 15, wherein, at the idle state, a maximum gap between the pressed portion and the outer lateral surface is larger than a maximum gap between the releasing portion and the outer lateral surface.

* * * * *